United States Patent
Betensky et al.

[11] Patent Number: 6,157,496
[45] Date of Patent: Dec. 5, 2000

[54] ZOOM LENS SYSTEM ADAPTED FOR USE IN A DIGITAL STILL CAMERA

[75] Inventors: Ellis I Betensky, West Toronto, Canada; Kevin Matherson, Ft. Collins, Colo.

[73] Assignee: Hewlett-Packard Company, Palo Alto, Calif.

[21] Appl. No.: 09/383,454

[22] Filed: Aug. 26, 1999

Related U.S. Application Data

[63] Continuation-in-part of application No. 09/208,968, Dec. 10, 1998, abandoned.

[51] Int. Cl.[7] .................................................. G02B 15/14
[52] U.S. Cl. .......................... 359/690; 359/689; 359/687
[58] Field of Search .................... 359/690, 689, 359/686, 687, 676, 680, 681, 682

[56] References Cited

U.S. PATENT DOCUMENTS

| | | | |
|---|---|---|---|
| 5,260,834 | 11/1993 | Shibata | 359/690 |
| 5,808,810 | 9/1998 | Mihara | 359/690 |

*Primary Examiner*—Georgia Epps
*Assistant Examiner*—Michael A Lucas

[57] ABSTRACT

A zoom lens system particularly suited for use with an electronic image sensor includes a first positive lens element group located at a fixed position during a zooming operation, a second moveable negative lens element group, and a third moveable positive lens element group that provides the majority of the magnification change during the zooming operation. The diameter of the first lens element group is relatively large and therefore the surfaces of its glass elements are only spherical. The second and third lens element groups are made of molded plastic lens elements and both contain weak lens elements with aspherical surfaces that primarily correct for aberrations. A conventional aperture stop is positioned between the second lens element group and the third lens element group. Drive mechanisms are used to move the second and third lens element groups back and forth along the optical axis in order to perform a zoom operation. The first and third lens element groups are movable to focus an image of the object on a CCD. The aperture stop is normally positioned at a fixed location along the optical axis during a wide angle-to-normal portion of the zooming operation, and is moveable along the optical axis with the third lens element group during a remainder portion of the zooming operation.

20 Claims, 6 Drawing Sheets

FOCAL LENGTH = 8.81 MM   NA = 0.1722 mm

FOCAL LENGTH = 17.5 mm   NA = 0.1372 mm

FOCAL LENGTH = 26.4 mm   NA = 0.125 mm

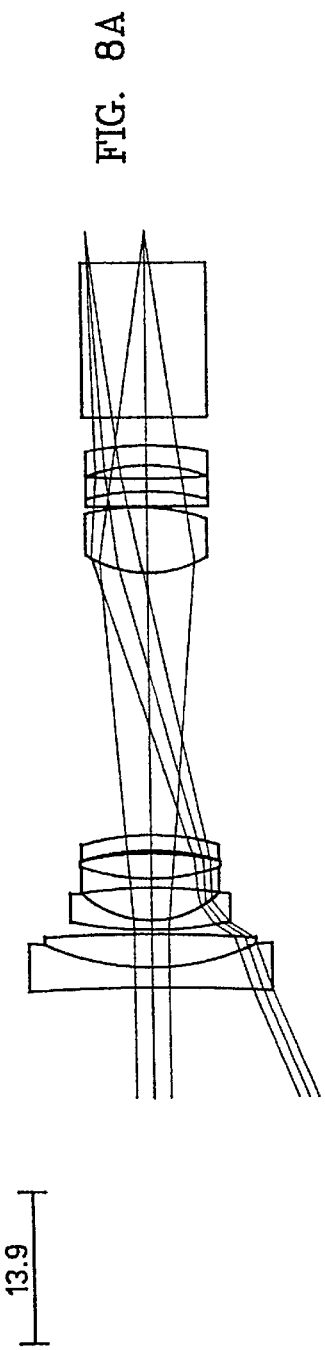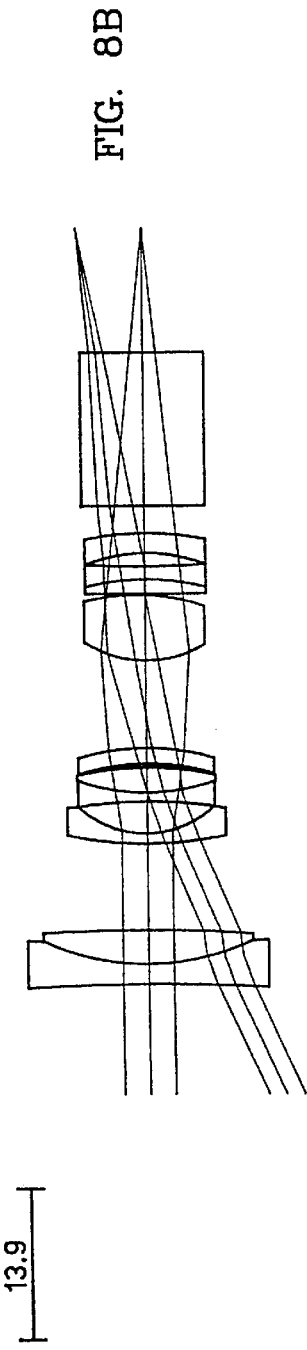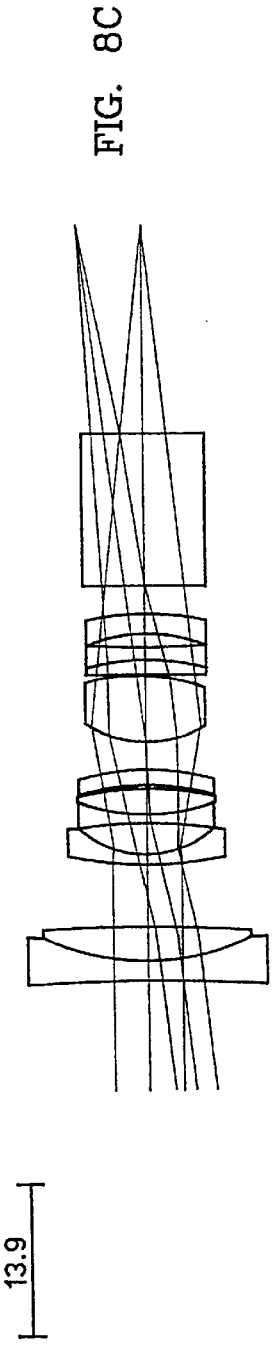

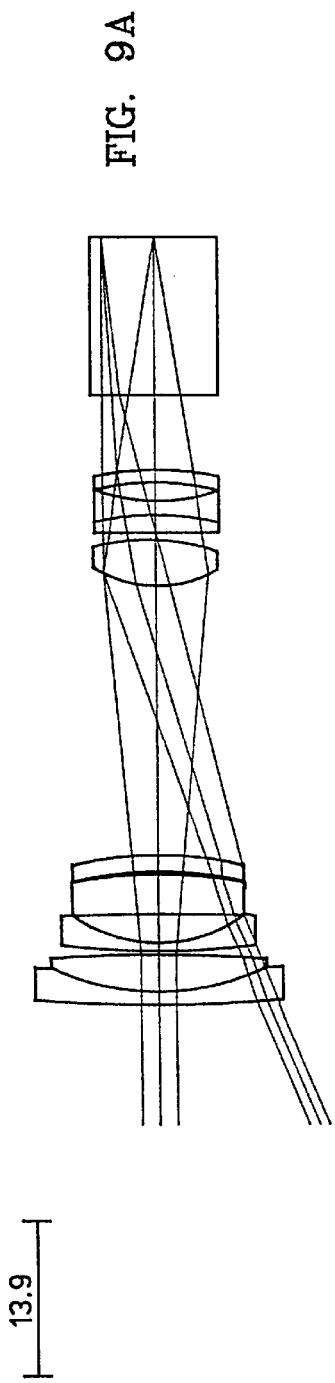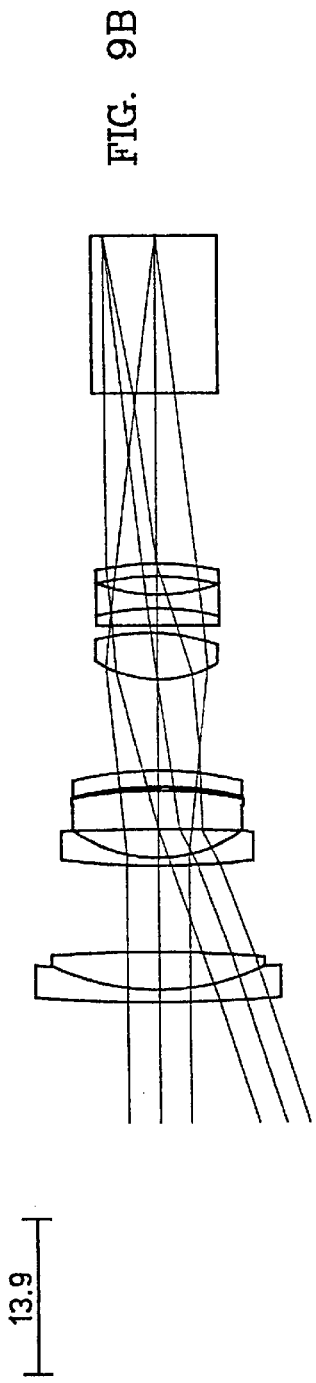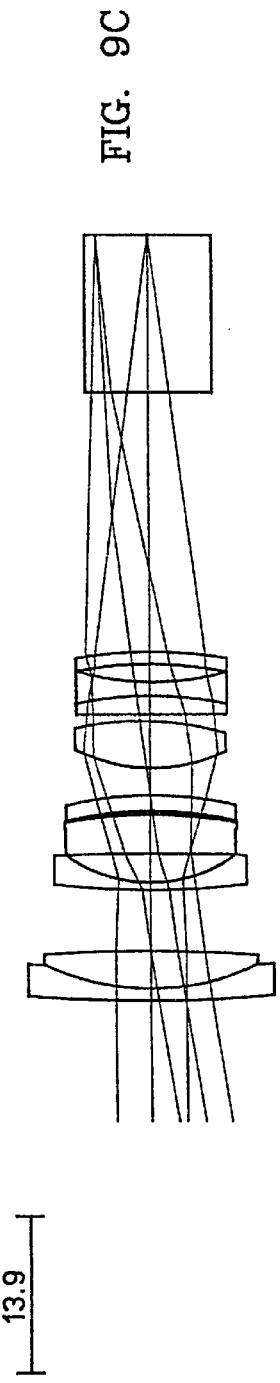

ZOOM LENS SYSTEM ADAPTED FOR USE IN A DIGITAL STILL CAMERA

CROSS-REFERENCE TO RELATED APPLICATION

This application is a continuation-in-part of prior U.S. patent application Ser. No. 09/208,968 filed Dec. 10, 1998, having the same title and co-inventors now abandoned.

BACKGROUND OF THE INVENTION

The present invention relates to optical systems, and more particularly, to a zoom lens system adapted for use in a compact camera that generates still images with an electronic image sensor.

Digital still cameras are rapidly gaining in popularity with consumers. They permit high resolution color images to be generated for subsequent printing by conventional ink jet or laser printers. The quality of the prints approaches that of conventional silver halide photographic film prints. More importantly, the digital images can be stored on different forms of media such as flash memory cards, floppy disks and compact disks, manipulated and stored in a personal computer, inserted into computer graphics applications such as word processing programs, sent to friends and relatives via e-mail, and transmitted as part of web pages. From an environmental standpoint, digital still cameras are attractive because they eliminate the need for chemical developer solutions.

A digital still camera includes a electronic image sensor which typically comprises an array of charge coupled detectors (CCDs). In the past, fixed focal length lens systems have been used with CCDs. For many applications, such systems are inadequate because a fixed focal length system cannot simultaneously provide a large angle of view and sufficient resolution to allow detailed examination of specific parts of the field of view. Although electronic zooming can be performed, i.e. zooming wherein a portion of the field of view is selected and electronically magnified to fill the entire viewing screen, such zooming does not increase the resolution of the original image captured by the CCD. Alternatively, the resolution of the original image can be improved by increasing the number of CCD pixels, but this approach significantly adds to the cost of the device and diffraction effects limit the extent to which pixel size can be reduced.

Thus, there exits a continuing need for improved variable power lens systems for use with electronic imaging systems. As is known in the art, variable power lens systems can have a discrete number of focal lengths at which the image is in focus at a fixed location, e.g. a dual power system, or can have a focal length which can vary continuously while producing a focused image at a fixed location, e.g. a zoom lens system. Alternatively, the image location need not be kept fixed, in which case, either the detecting device (CCD) or the lens system can be moved as the focal length of the lens system is varied either discretely or continuously.

U.S. Pat. No. 5,745,301 of Ellis L. Betensky et al. entitled VARIABLE POWER LENS SYSTEM FOR PRODUCING SMALL IMAGES granted Apr. 28, 1998 discloses variable power lens systems for use with electronic imaging systems, e.g. systems employing CCDs.

In developing a zoom lens system for a digital still camera, the following principles of conventional lens design must be taken into consideration:

1) The manufacturing cost of a lens element is primarily determined by the volume of the element and its surface area. For this reason, in most commercial applications lens designers typically try to minimize lens element diameters and thicknesses relative to the image size.

2) In zoom lens design, one or both of the pupils typically moves during zooming. This means that lens diameters must be increased to transmit the entire imaging bundle throughout the zooming range. To minimize this increase in lens diameters, lens designers typically use lens elements of relatively large powers. This, in turn, results in increased aberration contributions because of the large powers, and necessitates the inclusion of more lens elements for aberration correction.

Many hand held video cameras have zoom lens systems, however, their lenses are much larger with respect to the image sensor size than would be acceptable in a compact digital camera for taking still pictures. Furthermore, the need for a distantly located exit pupil in order to satisfy the color filter requirements of the electronic image sensor exacerbates the problem of size minimization. An additional complication involved in providing a zoom lens system in a compact digital still camera relates to the placement of the iris diaphragm. Ideally, the diaphragm should move independently during zooming and focusing to minimize aberration changes caused by the internal change of magnification for both object and pupil during zooming. But this usually requires additional mechanical linkages and controls. At the other end of the extreme is the least complex design in which the iris diaphragm remains fixed in position and opening size both during zooming and focusing.

Another major problem in designing lens systems for compact cameras is that large lens powers are needed to assure both small lens diameters and small lens system lengths. Large lens powers introduce large amounts of undesirable aberrations, which usually requires complex individual lens element groups to correct for these aberrations. This in turn undesirably increases the size of the lens system as more physical space is required to accommodate the extra lens elements.

SUMMARY OF THE INVENTION

It is therefore the primary object of the present invention to provide a zoom lens system particularly adapted for use with an electronic image sensor.

In accordance with our invention a zoom lens system is provided that is particularly adapted for use with an electronic image sensor. A first a first positive lens element group is located at a fixed position along an optical axis during a zooming operation. The first lens element group includes a first plurality of lens elements each having only spherical surfaces. A second negative lens element group is moveable along the optical axis on an image side of the first lens element group. The second lens element group includes a second plurality of lens elements including a lens element having at least one aspherical surface. A third positive lens element group is moveable along the optical axis on an image side of the second lens element group. The third lens element group includes a third plurality of lens elements including a pair of lens elements each having at least one aspherical surface. An aperture stop is positioned along the optical axis between the second lens element group and the third lens element group.

In accordance with another aspect of the present invention a zoom lens system, comprises first, second and third lens element groups. The first lens element group is positive and is located at a fixed position along an optical axis during a zooming operation. The second lens element group is negative and is moveable along the optical axis on an image side of the first lens element group. The third lens element group is positive and is moveable along the optical axis on an image side of the second lens element group. An aperture stop is normally at a second fixed position along the optical axis between the second lens element group and the third lens element group during a first wide angle-to-normal portion of the zooming operation. The aperture stop is moveable along the optical axis with the third lens element group during a second remainder portion of the zooming operation. The first and second lens element groups are movable to focus the image of an object on an electronic image sensor. First, second and third drive mechanisms move the lens element groups back and forth along the optical axis.

DESCRIPTION OF THE DRAWINGS

FIGS. 8A, 8B and 8C are schematic views of the same three lens groups of the exemplary zoom lens system of Table IV showing the lens groups in different relative positions.

FIGS. 9A, 9B and 9C are schematic views of the same three lens groups of the exemplary zoom lens system of Table V showing the lens groups in different relative positions.

Figure 1:
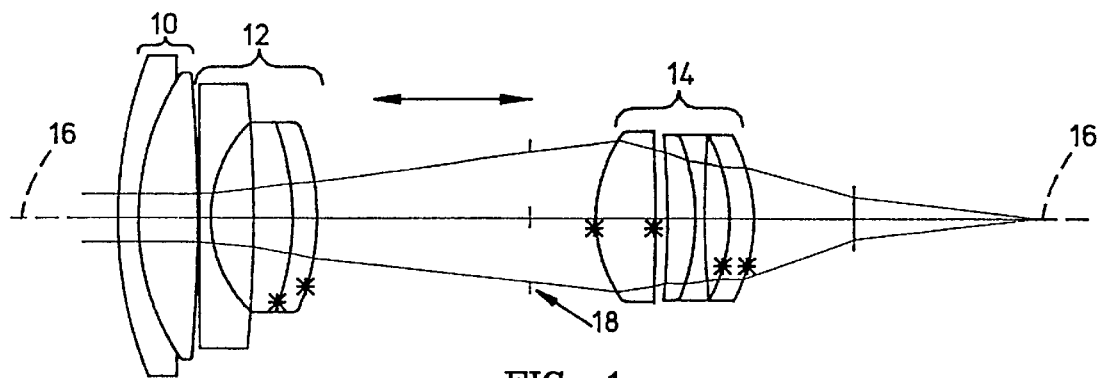
FIG. 1 is a schematic side view of three lens groups utilized in a preferred embodiment of the zoom lens system of the present invention.

The light paths in the drawing figures are illustrated diagrammatically by lines traveling through the various lens elements from left to right.

DESCRIPTION OF THE PREFERRED EMBODIMENT

Referring to FIG. 1, a preferred embodiment of my zoom lens system includes a first positive lens element group 10, a second negative lens element group 12 and a third positive lens element group 14 that provides the majority of the magnification change during zooming. The first, second and third lens element groups 10, 12 and 14 are spaced apart along a common optical axis 16. The second lens element group 12 is positioned on an image side of the first lens element group 10, between the first lens element group 10 and the third lens element group 14. The first lens element group 10 may, for example, be located in the outer housing of a digital still camera, and receives incoming light from an object in the field of view. This light passes through the various lens elements of the three groups 10, 12 and 14, moving from left to right in FIG. 1. The diameter of the first lens element group 10 is substantially larger than the diameters of second and third lens element groups 12 and 14.

Referring still to FIG. 1, the first positive lens element group 10 includes a lens element 10a and a lens element 10b. The second negative lens element group 12 includes lens elements 12a, 12b and 12c. The third positive lens element group 14 includes a lens element 14a, a lens element 14b, a lens element 14c and a lens element 14d. The lens elements 14b and 14c form a doublet.

A conventional aperture stop 18 (FIG. 1) is positioned between the second lens element group 12 and the third lens element group 14. The aperture stop 18 is illustrated diagrammatically as three dots on the lines that represent the light pathways through the lens groups. The aperture stop may be fixed or moveable and may comprise, for example, a diaphragm or shutter.

It will be understood that the first lens element group 10 is normally in a fixed position during a zooming operation. During the zooming operation the second and third lens element groups 12 and 14 are moveable back and forth along the optical axis 16 relative to the fixed first lens element group 10 and relative to each other. Focusing is accomplished by moving the third group 14 independently of the second group 12. The first lens element group 10 is also moved at least some during focusing since moving only the third lens element group 14 is not adequate for focusing over the entire zooming range. The lens elements of each the groups 10, 12 and 14 are generally fixed within that group and do not move relative to each other.

Thus our zoom lens system has three lens element groups, namely, a positive first group 10 that is fixed during zooming, a negative second group 12 that moves during zooming, and a positive third group 14 that also moves during zooming. Because the first group 10, which typically has the largest diameter of any of the groups, only moves a small amount during focusing, the mechanical system is simpler and more compact than conventional zoom lens systems requiring a moving first lens element group. In addition, our zoom lens system is more reliable and less expensive to manufacture than conventional zoom lens systems having more lens element groups and/or motions. Our zoom lens system reduces the placement distance for the exit pupil required to satisfy the color filter requirements of an electronic image sensor, thereby allowing it to be made more compact, i.e. have a shorter maximum total length along the optical axis 16.

Figure 2:
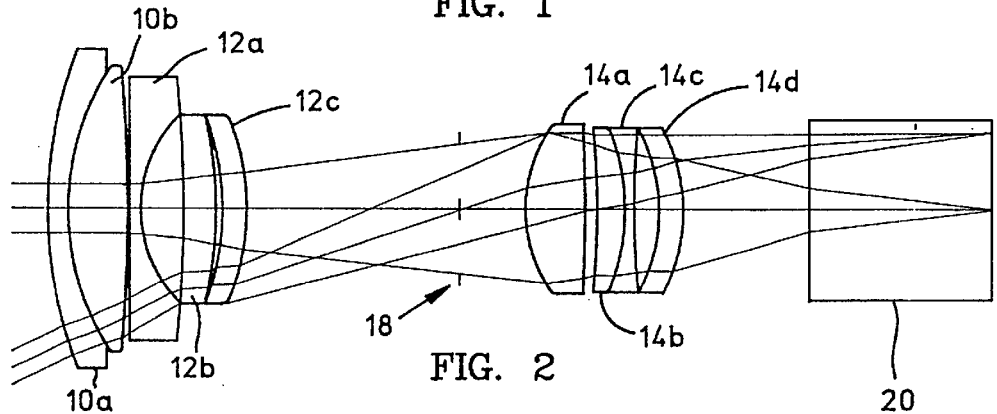
FIG. 2 is a view similar to FIG. 1 showing the lens groups in respective first positions transmitting light through a beam splitter.
Figure 5:
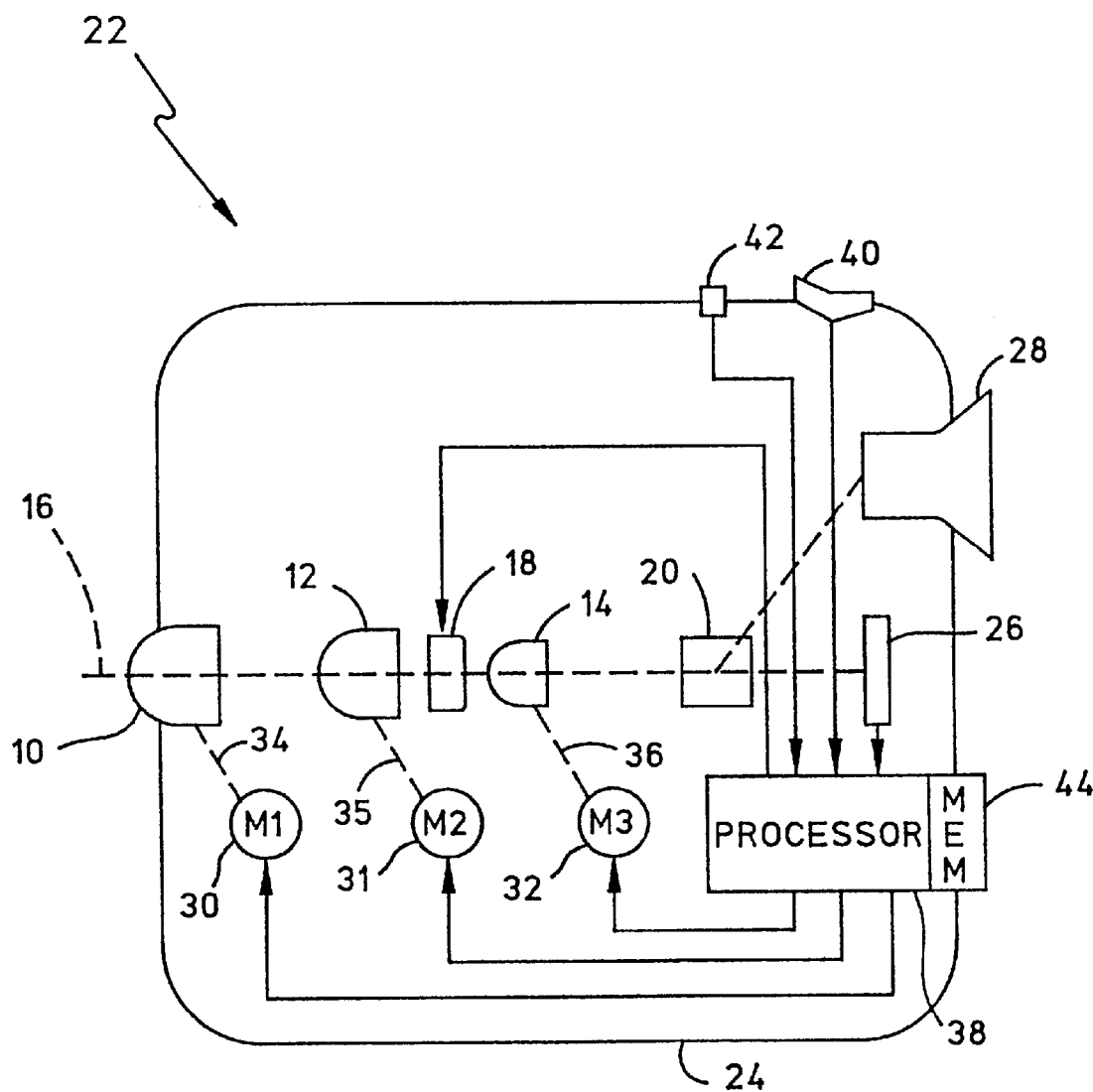
FIG. 5 is a greatly simplified block diagram of a digital still camera incorporating a zoom lens system having the three lens groups illustrated in FIGS. 1–4.

FIG. 2 shows the light path when the first, second and third lens element groups 10, 12 and 14 are in respective first positions. A conventional fixed beam splitter 20 divides the light transmitted by the third lens element group 14 and sends a first portion to a through-the-lens (TTL) view finder 28 (FIG. 5) and a second portion to an electronic image sensor 26 (FIG. 5). Other forms of optical diverters besides the beam splitter 20 could be used, such as a movable mirror. The optical powers of the lens element groups 10, 12 and 14 must be sufficient that the back focal length is long enough for the diverter to inserted into the optical path.

Figure 3:
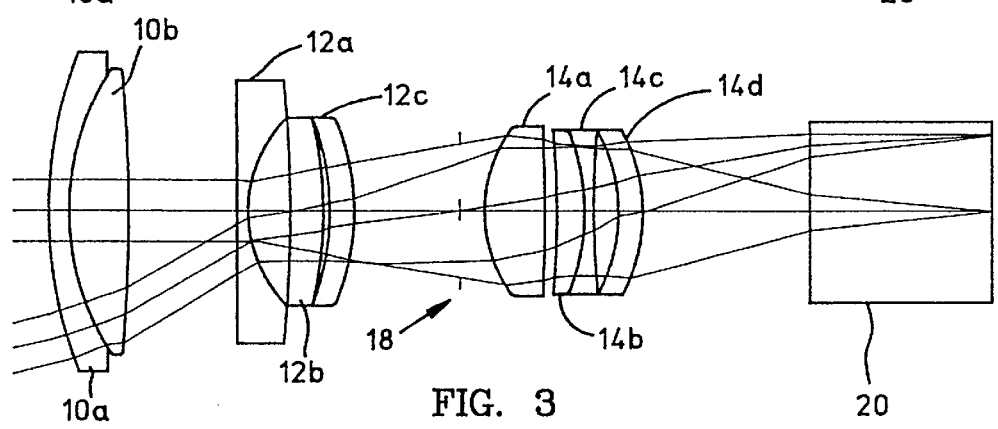
FIG. 3 is a view similar to FIG. 2 after the second and third lens groups have been moved to respective second positions.
Figure 4:
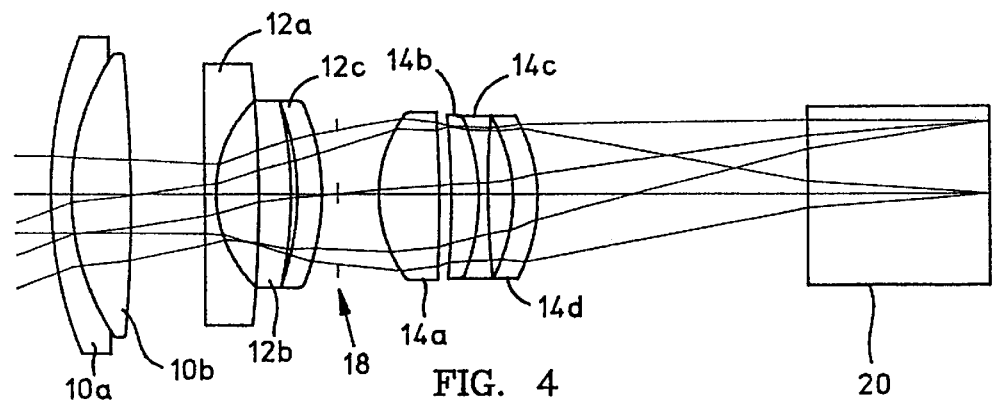
FIG. 4 is a view similar to FIG. 5 after the second and third lens groups have been moved to respective third positions.

In FIG. 3 the second lens element group 12 has been moved rearwardly, away from the first lens element group 10, and the third lens element group 14 has been moved forwardly toward both the first lens element group 10 and the second lens element group 12. In FIG. 4 the second lens element group 12 has been moved forwardly, toward the first lens element group 10, and the third lens element group 14 has been moved still further toward both the first lens element group 10 and the second lens element group 12.

When the lens groups 10, 12 and 14 are in their respective first positions illustrated in FIG. 2 the zoom lens system provides a wide angle field of view. After the second and third lens groups 12 and 14 have been moved to their respective second positions illustrated in FIG. 3 the field of view of the zoom lens system has changed to a medium field of view and a distant object in view been magnified. After the second and third lens groups 12 and 14 have been moved to their respective third positions illustrated in FIG. 4 the field of view of the zoom lens has changed to a narrow field of view and the object in view has been magnified still further. It will be understood that there are many other positions of the lens element groups 10, 12 and 14 between those illustrated in FIGS. 2–4. The focal length of our zoom lens system can vary continuously while producing a focused image at a fixed location. In zooming from wide angle to telephoto, the focal length goes from relatively short to relatively long. The field of view goes from wide to narrow and the magnification increases.

All lens elements in an optical system introduce some aberrations. Some lens elements in an optical system may be included for the specific purpose of correcting some of the aberrations introduced by other lens elements elsewhere in the optical system. Individual lens elements with aspherical surfaces are used in our zoom lens system primarily for the purpose of correcting for aberrations introduced elsewhere. This is especially true for the lens elements 12c and 14d of our zoom lens system that have relatively weak optical power. Other aspherical surfaces used in our zoom lens system, namely those used on the lens element 14a which has relatively strong optical power, have the effect of minimizing or eliminating the aberrations that would otherwise have been introduced by a spherical surface of equivalent optical power.

The lens elements 12a–c and 14a–d are preferably molded of suitable plastic material such as clear polystyrene or acrylic, as is well known to those of ordinary skill in the art of designing and assembling optical systems for inexpensive cameras. Because the first lens element group 10 has the largest diameter, its individual lens elements 10a and 10b are the most difficult to mold. Therefore the lens elements 10a and 10b are preferably both made of glass and have only spherical surfaces. The second lens element group 12 performs the function of compensating for the change of image position resulting from the motion of the third lens element group 14 which produces the internal change in magnification. Accordingly, the negative lens element 12c of the second lens element group 12 has relatively weak optical power and both its surfaces are aspherical as indicated diagrammatically by the asterisks (*) in FIG. 1. The lens element 12c primarily provides aberration correction. It is relatively easy to mold because it has relatively low power and relatively uniform thickness.

The third lens element group 14 (FIG. 1) provides the majority of the internal magnification changes, and as such it must have strong optical power. In order to provide color correction the third lens element group 14 must include negative power. Negative lenses are difficult to fabricate by molding. Therefore the positive lens element 14a which has relatively strong optical power is molded with both of its convex surfaces being aspherical as illustrated diagrammatically by the asterisks in FIG. 1. However, because the lens element 14a is relatively small, its strong convex surfaces do not shrink a significant amount during the molding process. The negative lens element 14d has relatively weak and both it surfaces are molded so that they are aspherical as illustrated diagrammatically by the asterisks in FIG. 1. This provides the balance of the aberration correction in our zoom lens system.

It will be understood by those of ordinary skill in the art that the lens elements 12c and 14d could be made with only one aspherical surface depending upon the degree of aberration correction required. The lens element 14a could also be made with only a single aspherical surface.

A problem encountered in most prior art compact zoom lens systems relates to the placement of the iris diaphragm. Ideally, the diaphragm should move independently during zooming and focusing, in order to minimize aberration changes caused by the internal change of magnification for both object and pupil during zooming. However, this would require additional mechanical linkages and controls. The least complex design has an iris diaphragm that remains fixed in position along the optical axis and which maintains a fixed size during zooming and focusing. In our zoom lens system, the diaphragm is represented generically by the aperture stop 18 in FIGS. 1–4. The moving positive third lens element group 14 preferably includes the aperture stop 18 and provides the majority of the magnification change during zooming. The aperture stop 18 is preferably held in a fixed in position along the optical axis 16 for the wide angle portion of the zooming operation (FIG. 2 ), and only moves forwardly when pushed by the third lens element group 14 as it moves forwardly (FIGS. 3 and 4). The aperture stop 18 thus remains stationary during a wide angle-to-normal portion of the zooming operation, and moves in unison with the third lens element group 14 during a remainder of the zooming range. The aperture stop 18 remains in a fixed location with respect to the image location, but then moves together with the third lens element group 14. The third lens element group 14, while moving during zooming, comes in contact with the aperture stop 18. The design of compact structures that can hold the second and third lens element groups 12 and 14 for independent movement, and which will also move the aperture stop 18 forwardly and rearwardly with the movement of the third lens element group 14 will readily occur to those of ordinary skill in the art and need not be described herein in further detail.

Table I below sets forth examples of the relative ratios of the optical powers of the first, second and third lens element groups 10, 12 and 14, which are listed as Groups I, II and III, respectively.

TABLE I

| Ratio of Group I to Group II | −0.161 |
| Ratio of Group II to Group III | −1.195 |
| Ratio of Group I to Group III | 0.192 |

FIG. 5 is a greatly simplified block diagram of a digital still camera 22 incorporating a zoom lens system having the three lens groups 10, 12 and 14 illustrated in FIGS. 1–4. The camera 22 includes a generally rectangular outer housing 24 that supports within the same the three lens groups 10, 12 and 14, the beam splitter 20 and the electronic image sensor 26. The first lens element group 10 is mounted in a front side of the housing 24. The view finder 28 is fixed in a rear side of the housing 24. Light from the object being photographed passes through the lens element groups 10, 12 and 14 and through the beam splitter 20. A first portion of the light is transmitted to the view finder 28 to enable the user to view the object through the zoom lens system. A second portion of the light is transmitted to the electronic image sensor 26.

Referring still to FIG. 5, drive means in the form of stepper motors 30, 31 and 32 associated drive linkages 34, 35 and 36 are used to independently move the first, second and third lens element groups 10, 12 and 14, respectively. A wide variety of drive means may be utilized including manually powered mechanisms and ultrasonic motors. The linkages may include, for example, worm gear drives and other mechanisms for translating rotational motion to linear motion. The aperture stop 18 is positioned between the second lens element group 12 and the third lens element group 14. The aperture stop 18 is also moved forwardly and rearwardly by the motor 32 and the drive linkage 36 as explained above.

Processing circuitry 38 (FIG. 5) inside the camera housing 24 receives the output signals from the electronic image sensor 26, amplifies them, digitizes them, and performs all the color balance and contrast adjustment functions in accordance with well known techniques. The aperture stop 18 is also controlled by the processing circuitry 38. The processing circuitry 38 also includes drive circuits for energizing the stepper motors 31 and 32 to permit ZOOM IN and ZOOM OUT operations in response to manual actuation of a pivoting rocker switch 40 mounted in a top side of the camera housing 24. The processing circuitry 38 also energizes the stepper motors 30 and 32 to accomplish focusing.

Individual images or pictures of objects and/or scenes of interest are "taken" with the camera 22 (FIG. 5) by depressing a push button 42 mounted in the top side of the camera housing 24. The images are stored in a flash memory card 44 that can be removed from the camera 22 and plugged into a compatible reader for downloading into a personal computer. The camera 24 can be provided with a flash or strobe (not illustrated) for taking pictures in low ambient light environments.

Figure 6A:
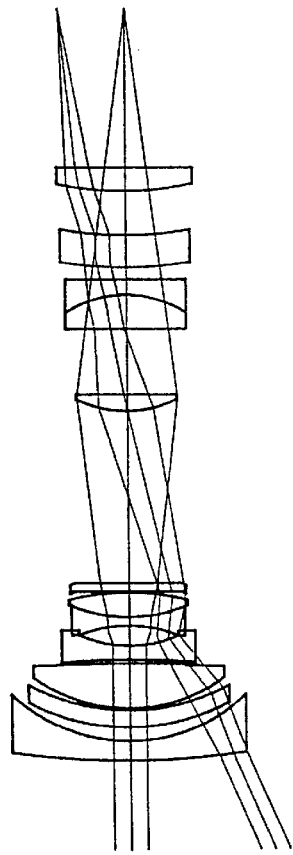
FIGS. 6A, 6B and 6C are schematic views of the same three lens groups of the exemplary zoom lens system of Table II showing the lens groups in different relative positions.
Figure 6B:
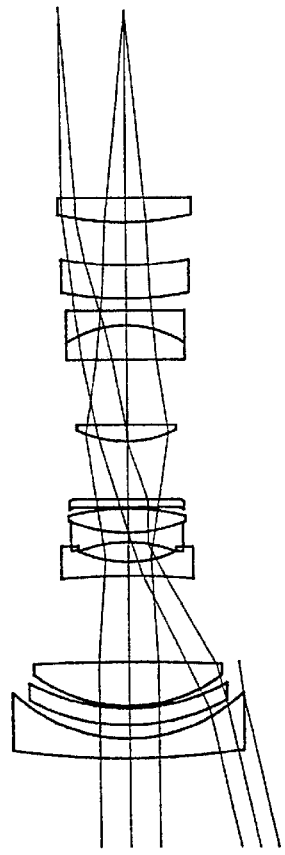
Figure 6C:
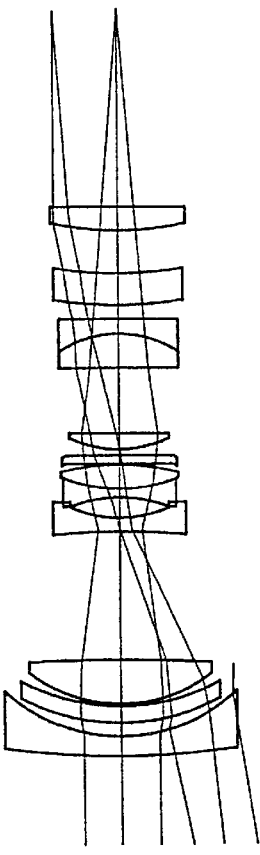

FIGS. 6A, 6B and 6C are schematic views of the same three lens groups of the exemplary zoom lens system of Table II showing the lens groups in different relative positions.

TABLE 11

| SRF | RADIUS | THICKNESS | APERTURE RADIUS | GLASS |
|---|---|---|---|---|
| OBJ | — | 7.5000e+18 | 4.9079e+18 | AIR |
| 1 | 49.441757 V | 2.000000 | 9.800000 | GLASS1 V |
| 2 | 14.447704 V | 1.488146 V | 9.600000 | AIR |
| 3 | 28.120795 V | 2.000000 | 8.400000 | ACRYL C* |
| 4 | 79.309696 V | 0.200000 | 8.500000 | AIR * |
| 5 | 16.548076 V | 3.500000 | 8.000000 | GLASS5 V |
| 6 | −56.696274 V | 0.300000 | 8.000000 K | AIR |
| 7 | −99.041067 V | 1.000000 | 5.700000 | GLASS7 V |
| 8 | 7.389552 V | 1.993226 V | 4.500000 | AIR |
| 9 | −13.254134 V | 1.000000 | 4.500000 | GLASS9 V |
| 10 | 22.511097 V | 0.188162 V | 5.000000 | AIR |
| 11 | 32.388983 V | 2.000000 | 5.200000 | GLASS11 V |
| 12 | −13.831185 V | 0.195316 V | 5.500000 | AIR |
| 13 | 42.007139 V | 1.000000 | 5.300000 | CARBO C* |
| 14 | 303.515873 V | 14.907511 V | 5.300000 | AIR * |
| AST | — | 0.196402 V | 3.845285 AS | AIR |
| 16 | 7.763770 V | 1.500000 | 4.000000 | ACRYL C* |
| 17 | 81.290857 V | 5.792242 V | 4.000000 | AIR |
| 18 | 91.225229 V | 3.000000 | 5.052904 | GLASS18 V |

TABLE 11-continued

| 19 | −9.471221 V | 1.000000 | 4.984258 | SFL57 C |
|---|---|---|---|---|
| 20 | −382.435977 V | 1.386725 V | 5.033059 | AIR |
| 21 | 10.027658 V | 2.261297 V | 5.4232205 | CARBO C* |
| 22 | 9.174902 V | 3.594751 V | 5.278480 S | AIR * |
| 23 | 17.956713 V | 2.500000 | 6.132988 S | GLASS25 V |
| 24 | 7.1924e+03 V | 10.000255 S | 6.087121 S | AIR |
| IMS | — | — | 5.764989 S | |

*CONIC AND POLYNOMIAL ASPHERIC DATA

| SRF | CC | AD | AE | AF | AG |
|---|---|---|---|---|---|
| 3 | — | 6.1808e−05 | 5.9113e−07 | −9.4460e−09 | 9.3211e−11 |
| 4 | — | 6.0812e−05 | 7.3512e−07 | −1.2371e−08 | 1.1872e−10 |
| 13 | — | −9.7716e−05 | −1.4236e−05 | 6.0456e−07 | −3.5404e−08 |
| 14 | — | −0.000303 | −6.6603e−06 | −1.5944e−07 | −1.3262e−08 |
| 16 | — | −0.000156 | 4.1967e−06 | −5.4504e−07 | 1.6516e−08 |
| 21 | — | −0.000518 | −2.3794e−05 | −5.6233e−07 | 2.8275e−08 |
| 22 | — | −0.000250 | −3.3198e−05 | 9.4462e−08 | 1.7469e−08 |

*REFRACTIVE INDICES

| SRF | GLASS | RN1 | RN2 | RN3 | VNBR |
|---|---|---|---|---|---|
| 1 | GLASS1 | 1.720971 | 1.733793 | 1.709412 | 29.570311 |
| 5 | GLASS5 | 1.700556 | 1.706935 | 1.694467 | 56.190131 |
| 7 | GLASS7 | 1.876905 | 1.888026 | 1.866631 | 40.985175 |
| 9 | GLASS9 | 1.694966 | 1.701507 | 1.688745 | 54.456384 |
| 11 | GLASS11 | 1.732017 | 1.745362 | 1.720005 | 28.869270 |
| 16 | ACRYL | 1.492067 | 1.496540 | 1.487978 | 57.474701 |
| 18 | GLASS18 | 1.615665 | 1.620850 | 1.610668 | 60.465397 |
| 19 | SFL57 | 1.855090 | 1.874505 | 1.838026 | 23.440243 |
| 21 | CARBO | 1.590088 | 1.600365 | 1.580754 | 30.090095 |
| 23 | GLASS25 | 1.792266 | 1.799726 | 1.785172 | 54.435138 |
| 25 | IMAGE SURFACE | | | | |

*ZOOM LENS DATA

| ---EF--- | -IMAGE- DISTANCE | EFFECTIVE INFINITY ---f/#--- | ---f/#--- | ---H'--- | -FIELD- -ANGLE- |
|---|---|---|---|---|---|
| 8.8098 | 10.0003 | 2.9034 | 2.9034 | 5.7650 | 33.2000 |
| 17.4976 | 13.2231 | 3.6453 | 3.6453 | 5.7529 | 18.2000 |
| 26.3965 | 14.2054 | 3.9995 | 3.9995 | 5.7554 | 12.3000 |

*ZOOM LENS SPACINGS

| TH(6) | TH(14) | TH(24) |
|---|---|---|
| 0.3000 | 14.9075 | 10.0003 |
| 6.8980 | 5.0851 | 13.2231 |
| 10.7043 | 0.3000 | 14.2054 |

Figure 7A:
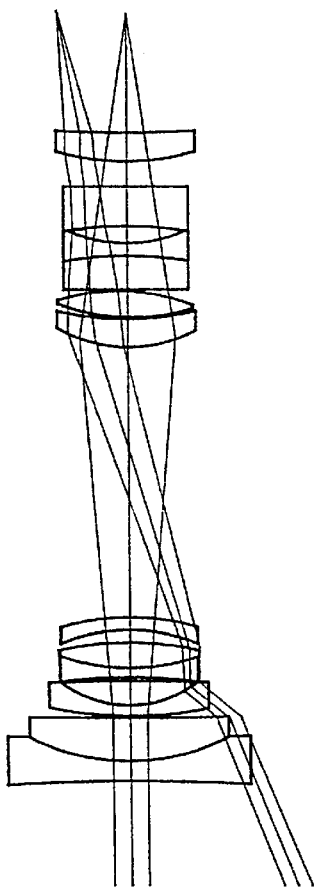
FIGS. 7A, 7B and 7C are schematic views of the same three lens groups of the exemplary zoom lens system of Table III showing the lens groups in different relative positions.
Figure 7B:
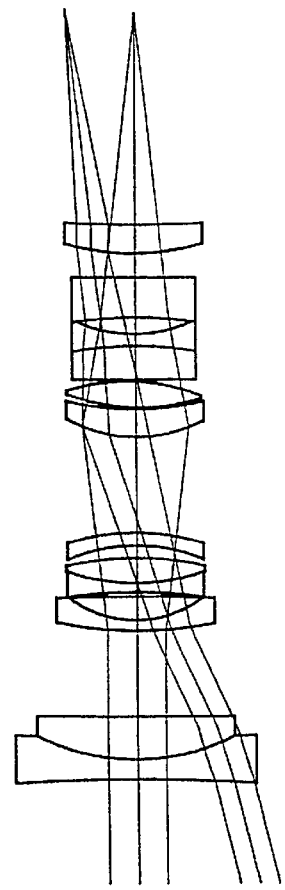
Figure 7C:
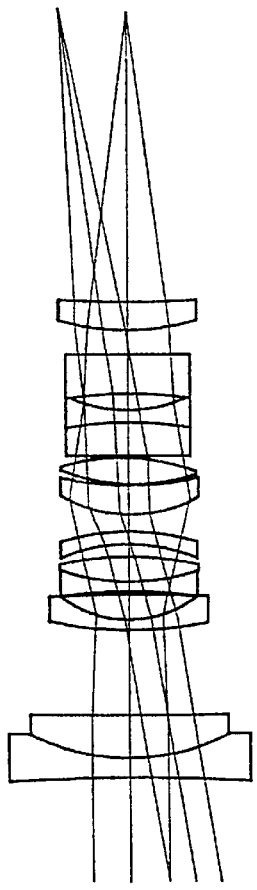

FIGS. 7A, 7B and 7C are schematic views of the same three lens groups of the exemplary zoom lens system of Table III showing the lens groups in different relative positions.

TABLE III

| SRF | RADIUS | THICKNESS | APERTURE RADIUS | GLASS |
|---|---|---|---|---|
| OBJ | — | 7.5000e+18 | 4.9079e+18 | AIR |
| 1 | −452.147116 V | 1.500000 | 9.800000 | GLASS1 V |
| 2 | 15.558474 V | 0.200042 V | 8.000000 | AIR |
| 3 | 16.794376 V | 3.500000 | 8.000000 | GLASS5 V |
| 4 | −116.980297 V | 0.300000 | 8.000000 | AIR |
| 5 | 18.747343 V | 1.000000 | 6.500000 | GLASS7 V |
| 6 | 7.132324 V | 2.499010 V | 5.000000 | AIR |
| 7 | −31.751878 V | 1.000000 | 5.000000 | GLASS9 V |
| 8 | 24.360136 V | 0.192894 V | 5.500000 | AIR |
| 9 | 20.652268 V | 2.000000 | 5.500000 | SF6 C |
| 10 | −31.398913 V | 1.329870 V | 5.700000 | AIR |
| 11 | −15.641945 V | 1.000000 | 5.300000K | ACRYL C* |

TABLE III-continued

| SRF | RADIUS | THICKNESS | APERTURE RADIUS | GLASS |
|---|---|---|---|---|
| 12 | -28.440640 V | 13.376955 V | 5.300000 | AIR * |
| AST | — | 7.997623 V | 3.173170 AS | AIR |
| 14 | 9.582534 V | 2.150726 V | 5.500000 | ACRYL C |
| 15 | 24.098574 V | 0.196948 V | 5.500000 K | AIR * |
| 16 | 10.367177 V | 2.764330 V | 5.500000 | ACRYL C |
| 17 | -19.008141 V | 0.194964 V | 5.500000 | AIR * |
| 18 | -397.814025 V | 3.000000 | 5.052904 | GLASS18 V |
| 19 | -17.943939 V | 1.000000 | 4.984258 | SF6 C |
| 20 | 16.041922 V | 1.297262 V | 5.033059 | AIR |
| 21 | -27.892179 V | 3.017994 V | 5.000000 | CARBO C* |
| 22 | -265.627189 V | 1.632328 V | 5.000000 | AIR * |
| 23 | 17.923588 V | 2.500000 | 5.000000 K | GLASS25 V |
| 24 | 47.528684 V | 9.999748 S | 5.500000 | AIR |
| IMS | — | — | 5.764004 S | |

*CONIC AND POLYNOMIAL ASPHERIC DATA

| SRF | CC | AD | AE | AF | AG |
|---|---|---|---|---|---|
| 11 | — | -0.000547 | 1.2121e-05 | -7.1283e-07 | 1.1606e-08 |
| 12 | — | -0.000617 | 1.1094e-05 | -6.0298e-07 | 1.0378e-08 |
| 15 | — | 0.000180 | -8.1756e-06 | 6.0962e-07 | -6.8005e-09 |
| 17 | — | 0.000135 | 7.6488e-06 | -9.7749e-07 | 1.7933e-08 |
| 21 | — | -3.4227e-05 | 1.2384e-05 | -3.0818e-06 | 7.1506e-08 |
| 22 | — | 0.000376 | 1.2215e-05 | -1.2284e-06 | 3.1254e-08 |

*REFRACTIVE INDICES

| SRF | GLASS | RN1 | RN2 | RN3 | VNBR |
|---|---|---|---|---|---|
| 1 | GLASS1 | 1.602771 | 1.610846 | 1.595345 | 38.886429 |
| 3 | GLASS5 | 1.806078 | 1.813889 | 1.798674 | 52.979679 |
| 5 | GLASS7 | 1.819013 | 1.828998 | 1.809757 | 42.566095 |
| 7 | GLASS9 | 1.806475 | 1.814658 | 1.798755 | 50.711198 |
| 16 | ACRYL | 1.492067 | 1.496540 | 1.487978 | 57.474701 |
| 18 | GLASS18 | 1.804731 | 1.812421 | 1.797429 | 53.678062 |
| 19 | SF6 | 1.812644 | 1.829702 | 1.797509 | 25.242972 |
| 21 | CARBO | 1.590088 | 1.600365 | 1.580754 | 30.090095 |
| 23 | GLASS25 | 1.792266 | 1.805142 | 1.780592 | 32.271667 |

*ZOOM LENS DATA

| | -IMAGE- | EFFECTIVE | INFINITY | -FIELD- | |
|---|---|---|---|---|---|
| ---EF--- | DISTANCE | ---f/#--- | ---f/#--- | ---H'--- | -ANGLE- |
| 8.8083 | 9.9997 | 2.9029 | 2.9029 | 5.7640 | 33.2000 |
| 17.4998 | 15.1096 | 3.6458 | 3.6458 | 5.7536 | 18.2000 |
| 26.3979 | 21.7264 | 3.9997 | 3.9997 | 5.7557 | 12.3000 |

*ZOOM LENS SPACINGS

| TH(4) | TH(12) | TH(13) | TH(24) |
|---|---|---|---|
| 0.3000 | 13.3770 | 7.9976 | 9.9997 |
| 8.1163 | 2.2456 | 6.2002 | 15.1096 |
| 7.6529 | 0.3000 | 1.9969 | 21.7264 |

FIGS. 8A, 8B and 8C are schematic views of the same three lens groups of the exemplary zoom lens system of Table IV showing the lens groups in different relative positions.

TABLE IV

| SRF | RADIUS | THICKNESS | APERTURE RADIUS | GLASS |
|---|---|---|---|---|
| OBJ | — | 7.5000e+18 | 4.9079e+18 | AIR |
| 1 | -104.068031 V | 1.500000 | 10.500000 | F2 C |
| 2 | 17.952841 V | 0.203787 V | 9.500000 | AIR |

TABLE IV-continued

| SRF | RADIUS | THICKNESS | APERTURE RADIUS | GLASS |
|---|---|---|---|---|
| 3 | 21.085852 V | 3.500000 | 9.000000 | LAFN21 C |
| 4 | -50.396892 V | 0.300000 | 9000000 | AIR |
| 5 | 18.367354 V | 1.000000 | 7.000000 | LASFN30 C |
| 6 | 7.790893 V | 3.752116 V | 6.000000 | AIR |
| 7 | -19.823174 V | 1.000000 | 6.000000 | LAFN21 C |
| 8 | 33.410306 V | 0.195889 V | 6.000000 | AIR |
| 9 | 36.673805 V | 2.000000 | 6.000000 | SF6 C |
| 10 | -20.551473 V | 0.225303 V | 6.000000 | AIR |
| 11 | -195.150172 V | 1.000000 | 5.700000 K | ACRYL C* |
| 12 | 41.106268 V | 13.284939 V | 5.300000 | AIR * |
| AST | — | 8.118286 V | 3.247290 AS | AIR |
| 14 | 7.946855 V | 6235452 V | 5.500000 K | ACRYL C* |
| 15 | -12.844036 V | 0.297248 V | 5.500000 | AIR * |
| 16 | -396.415149 V | 1.598929 V | 5.052904 | LAK8 C |
| 17 | -10.578867 V | 1.000000 | 4.984258 | SF13 C |
| 18 | 32.444995 V | 1.299199 V | 5.033059 | AIR |
| 19 | -8.794362 V | 1.694144 V | 5.000000 | CARBO C* |
| 20 | -10.665377 V | 2.246488 V | 5.000000 | AIR * |
| 21 | — | 13.900000 | 6.159412 S | BK7 C |
| 22 | — | 3.201581 S | 5.500000 | AIR |
| IMS | — | — | 5.759350 S | |

*CONIC AND POLYNOMIAL ASPHERIC DATA

| SRF | CC | AD | AE | AF | AG |
|---|---|---|---|---|---|
| 11 | — | -0.001295 | 2.5523e-05 | -9.3229e-07 | 1.3646e-08 |
| 12 | — | -0.001380 | 3.1397e-05 | -1.0996e-06 | 1.7226e-08 |
| 14 | — | -0.000130 | 5.4763e-06 | -1.8520e-07 | 3.8435e-09 |
| 15 | — | 0.000476 | 1.3903e-05 | -6.3398e-07 | 1.4983e-08 |
| 19 | — | 0.000779 | 3.9461e-05 | -2.4683e-06 | 4.0666e-08 |
| 20 | — | 0.000687 | 2.7053e-05 | -1.1138e-06 | 1.7157e-08 |

*REFRACTIVE INDICES

| SRF | GLASS | RN1 | RN2 | RN3 | VNBR |
|---|---|---|---|---|---|
| 1 | F2 | 1.624078 | 1.633099 | 1.615820 | 36.117500 |
| 5 | LASFN30 | 1.807299 | 1.816303 | 1.798809 | 46.145716 |
| 7 | LAFN21 | 1.792258 | 1.800879 | 1.784108 | 47.238984 |
| 9 | SF6 | 1.812644 | 1.829702 | 1.797509 | 25.242972 |
| 14 | ACRYL | 1.492067 | 1.496540 | 1.487978 | 57.474701 |
| 16 | LAK8 | 1.716158 | 1.722973 | 1.709618 | 53.624889 |
| 17 | SF13 | 1.747098 | 1.761527 | 1.734247 | 27.386332 |
| 19 | CARBO | 1.590088 | 1.600365 | 1.580754 | 30.090095 |
| 21 | BK7 | 1.518721 | 1.522829 | 1.514721 | 63.978408 |

*ZOOM LENS DATA

| | -IMAGE- | EFFECTIVE | INFINITY | -FIELD- | |
|---|---|---|---|---|---|
| ---EF--- | DISTANCE | ---f/#--- | ---f/#--- | ---H'--- | -ANGLE- |
| 8.8012 | 3.2016 | 2.9006 | 2.9006 | 5.7593 | 33.2000 |
| 17.5011 | 9.1773 | 3.6461 | 3.6461 | 5.7541 | 18.2000 |
| 26.3986 | 16.9169 | 3.9998 | 3.9998 | 5.7558 | 12.3000 |

*ZOOM LENS SPACINGS

| TH(4) | TH(12) | TH(13) | TH(22) |
|---|---|---|---|
| 0.3000 | 13.2849 | 8.1183 | 3.2016 |
| 7.4559 | 3.1544 | 5.1162 | 9.1773 |
| 5.6147 | 0.3000 | 2.0755 | 16.9169 |

FIGS. 9A, 9B and 9C are schematic views of the same three lens groups of the exemplary zoom lens system of Table V showing the lens groups in different relative positions.

TABLE V

| SRF | RADIUS | THICKNESS | APERTURE RADIUS | GLASS SPE NOTE |
|---|---|---|---|---|
| OBJ | — | 7.5000e+18 | 4.9008e+18 | AIR |
| 1 | 49.984069 V | 1.500000 | 10.500000 K | SFL6 C |
| 2 | 18.554361 V | 0.194584 V | 9.000000 | AIR |
| 3 | 19.754837 V | 3.446866 V | 9.000000 | F6 C |
| 4 | −97.704289 V | 0.300000 | 9.000000 | AIR |
| 5 | 94.787716 V | 1.000000 | 8.000000 | O_S-LAM54 C |
| 6 | 7.735485 V | 3.196371 V | 6.000000 | AIR |
| 7 | −50.041746 V | 2.545823 V | 6.000000 | SF57 C |
| 8 | −15.393491 V | 0.639180 V | 6.000000 | AIR |
| 9 | −15.566331 V | 1.000000 | 5.900000 | ACRYL C* |
| 10 | −132.944335 V | 16.794715 V | 5.900000 K | AIR * |
| AST | — | 6.161568 V | 3.905589 AS | AIR |
| 12 | 8.735651 V | 4.525165 V | 5.500000 | ACRYL C* |
| 13 | −15.096545 V | 1.255321 V | 4.800000 K | AIR * |
| 14 | −45.170559 V | 1.936589 V | 5.052904 | LAK8 C |
| 15 | −10.405085 V | 1.000000 | 4.984258 | SF3 C |
| 16 | 30.129513 V | 1.853988 V | 5.033059 | AIR |
| 17 | −10.272801 V | 1.788179 V | 5.000000 | ACRYL C* |
| 18 | −7.721855 V | 6.980000 | 4.900000 K | AIR * |
| 19 | — | 13.900000 | 6.500000 | BK7 C |
| 20 | — | 0.059315 S | 5.500000 | AIR |
| IMS | — | −0.059351 V | 5.699048 S | |

*ASPHERIC SURFACE DATA

9 ASP  ASR   14 - SYMMETRIC GENERAL ASPHERE
  AS0  —         AS1  —          AS2  −0.000737    AS3  1.9371e−05
  AS4  −5.6718e−07  AS5  1.3670e−08  AS6  −3.3430e−10  AS7  3.4972e−12
10 ASP  ASR   14 - SYMMETRIC GENERAL ASPHERE
  AS0  —         AS1  —          AS2  −0.000897    AS3  2.2751e−05
  AS4  −7.5589e−07  AS5  1.7010e−08  AS6  3.2762e−10   AS7  3.1965e−12
12 ASP  ASR   14 - SYMMETRIC GENERAL ASPHERE
  AS0  —         AS1  —          AS2  −4.1429e−05  AS3  3.2579e−06
  AS4  2.6628e−09   AS5  4.7242e−09   AS6  −3.1411e−11  AS7  1.7511e−12
13 ASP  ASR   14 - SYMMETRIC GENERAL ASPHERE
  AS0  —         AS1  —          AS2  0.000361     AS3  5.1547e−06
  AS4  −4.6480e−08  AS5  1.2257e−08   AS6  −1.9215e−10  AS7  7.5236e−12
17 ASP  ASR   14 - SYMMETRIC GENERAL ASPHERE
  AS0  —         AS1  —          AS2  −0.000153    AS3  −3.1452e−05
  AS4  3.0684e−06   AS5  −7.9647e−08  AS6  3.0208e−10   AS7  8.1403e−12
18 ASP  ASR   14 - SYMMETRIC GENERAL ASPHERE
  AS0  —         AS1  —          AS2  9.3448e−05   AS3  −8.8244e−06
  AS4  7.4572e−07   AS5  2.5151e−08   AS6  −1.7892e−09  AS7  2.7353e−11

*REFRACTIVE INDICES

| SRF | GLASS | RN1 | RN2 | RN3 | VNBR | TCE |
|---|---|---|---|---|---|---|
| 0 | AIR | 1.000000 | 1.000000 | 1.000000 | — | — |
| 1 | SFL6 | 1.813916 | 1.840932 | 1.800478 | 20.119270 | 90.000000 |
| 2 | AIR | 1.000000 | 1.000000 | 1.000000 | — | 236.000000 |
| 3 | F6 | 1.641340 | 1.656222 | 1.633640 | 28.401030 | 85.000000 |
| 4 | AIR | 1.000000 | 1.000000 | 1.000000 | — | 236.000000 |
| 5 | O_S-LAM54 | 1.761390 | 1.774059 | 1.754560 | 39.047499 | 57.000000 |
| 6 | AIR | 1.000000 | 1.000000 | 1.000000 | — | 236.000000 |
| 7 | SF57 | 1.856455 | 1.886769 | 1.841399 | 18.877324 | 83.000000 |
| 8 | AIR | 1.000000 | 1.000000 | 1.000000 | — | 236.000000 |
| 9 | ACRYL | 1.492403 | 1.499298 | 1.488808 | 46.940121 | — |
| 10 | AIR | 1.000000 | 1.000000 | 1.000000 | — | 236.000000 |
| 11 | AIR | 1.000000 | 1.000000 | 1.000000 | — | 236.000000 |
| 12 | ACRYL | 1.492403 | 1.499298 | 1.488808 | 46.940121 | — |
| 13 | AIR | 1.000000 | 1.000000 | 1.000000 | — | 236.000000 |
| 14 | LAK8 | 1.716683 | 1.727142 | 1.710947 | 44.251987 | 56.000000 |
| 15 | SF3 | 1.747248 | 1.769323 | 1.736082 | 22.480006 | 84.000000 |
| 16 | AIR | 1.000000 | 1.000000 | 1.000000 | — | 236.000000 |
| 17 | ACRYL | 1.492403 | 1.499298 | 1.488808 | 46.940121 | — |
| 18 | AIR | 1.000000 | 1.000000 | 1.000000 | — | 236.000000 |
| 19 | BK7 | 1.519039 | 1.525320 | 1.515539 | 53.071437 | 71.000000 |
| 20 | AIR | 1.000000 | 1.000000 | 1.000000 | — | 236.000000 |
| 21 | IMAGE SURFACE | | | | | |

TABLE V-continued

*ZOOM LENS DATA

| | -IMAGE- | EFFECTIVE INFINITY | | | -FIELD- |
|---|---|---|---|---|---|
| ---EF--- | DISTANCE | ---f/#--- | ---f/#--- | ---H'--- | -ANGLE- |
| 8.7174 | −0.0000 | 2.6724 | 2.6724 | 5.6879 | 33.1620 |
| 17.5480 | −0.0000 | 3.4408 | 3.4408 | 5.7531 | 18.2000 |
| 26.3621 | 0.0000 | 4.2519 | 4.2519 | 5.7283 | 12.3000 |

*ZOOM LENS SPACINGS

| TH(4) | TH(10) | TH(11) | TH(18) | TH(20) | TH(21) |
|---|---|---|---|---|---|
| 0.3000 | 16.7947 | 6.1616 | 6.9800 | 0.0593 | −0.0594 |
| 7.9225 | 7.2178 | 1.3000 | 13.7257 | 0.1013 | −0.1013 |
| 5.8310 | 1.0000 | 1.3000 | 22.1423 | 0.1504 | −0.1504 |

While we have described a preferred embodiment of our zoom lens system in connection with a digital still camera and given detailed technical specifications of several exemplary embodiments thereof, it will be appreciated by those of ordinary skill in the art that our zoom lens system may be utilized in other optical applications. The specific optical characteristics of the lens elements can be optimized for the particular requirements of each application. The means for mounting and moving the first, second and third lens element groups can be widely varied. The aperture stop can be fixed or moveable and may be widely varied in configuration. Accordingly, the protection afforded our invention should only be limited in accordance with the scope of the following claims.

We claim:

1. A zoom lens system, comprising:
   a first positive lens element group located at a first position along an optical axis, the first lens element group having a first plurality of lens elements each having only spherical surfaces;
   a second negative lens element group moveable along the optical axis on an image side of the first lens element group, the second lens element group having a second plurality of lens elements consisting of three lens elements including a lens element having at least one aspherical surface located on an image side of the second lens element group;
   a third positive lens element group moveable along the optical axis on an image side of the second lens element group, the third lens element group providing a majority of the magnification change during a zooming operation and having a third plurality of lens elements including a pair of lens elements each having at least one aspherical surface; and
   an aperture stop positioned along the optical axis between the second lens element group and the third lens element group, the aperture stop remaining stationary during a wide angle-to-normal portion of a zooming operation and moving in unison with the third lens element group during a remainder portion of the zooming operation.

2. The zoom lens system of claim 1 wherein the lens elements of the first group are made of glass and the lens elements of the second and third lens element groups are made of plastic.

3. The zoom lens system of claim 1 wherein the second and third lens element groups each include a lens element with aspherical surfaces and relatively weak optical power for correcting aberrations.

4. The zoom lens system according to claim 1 wherein the lens element of the second lens element group having at least one aspherical surface is negative, has a relatively weak optical power and primarily corrects for aberrations.

5. The zoom lens system according to claim 1 wherein the third plurality of lens elements of the third lens element group includes both positive and negative lens elements.

6. The zoom lens system according to claim 1 wherein the third plurality of lens elements includes a positive lens element on the object side of the third lens element group, the positive lens element having at least one aspherical surface and relatively strong optical power.

7. The zoom lens system according to claim 6 wherein the third plurality of lens elements further includes a negative lens element on the image side of the third lens element group, the negative lens element primarily correcting for aberrations and having at least one aspherical surface and relatively weak optical power.

8. The zoom lens system according to claim 1 wherein a ratio of the optical powers between the first lens element group and the second lens element group is about −0.161, a ratio of the optical powers between the second lens element group and the third lens element group is about −1.195, and a ratio of the optical powers between the first lens element group and the third lens element group is about 0.192.

9. A zoom lens system, comprising:
   a first positive lens element group located at a first position along an optical axis;
   a second negative lens element group moveable along the optical axis on an image side of the first lens element group;
   a third positive lens element group moveable along the optical axis on an image side of the second lens element group;
   an aperture stop normally at a second fixed position along the optical axis between the second lens element group and the third lens element group during a first wide angle-to-normal portion of a zooming operation and moveable along the optical axis with the third lens element group during a second remainder portion of the zooming operation;
   first drive means for moving the first lens element group back and forth along the optical axis during a focusing operation;
   second drive means for moving the second lens element group back and forth along the optical axis during the zooming operation; and
   third drive means for moving the third lens element group and the aperture stop back and forth along the optical axis during the zooming operation.

10. The zoom lens system according to claim 9 wherein the first lens element group comprises a first plurality of lens elements each having only spherical surfaces.

11. The zoom lens system according to claim 10 wherein the second lens element group comprises a second plurality of lens elements including a lens element having at least one aspherical surface for primarily correcting aberrations.

12. The zoom lens system according to claim 11 wherein the third lens element group comprises a third plurality of lens elements including a pair of lens elements each having aspherical surfaces.

13. The zoom lens system according to claim 9 wherein the third plurality of lens elements includes a positive lens element on the object side of the third lens element group, the positive lens element having at least one aspherical surface and relatively strong optical power.

14. The zoom lens system according to claim 13 wherein the third plurality of lens elements further includes a negative lens element on the image side of the third lens element group, the negative lens element primarily correcting for aberrations and having at least one aspherical surface and relatively weak optical power.

15. The zoom lens system according to claim 9 and further comprising an optical diverter positioned along the optical axis on the image side of the third lens element group.

16. The zoom lens system according to claim 15 and further comprising an electronic image sensor positioned along the optical axis on an image side of the optical diverter for generating signals representative of an image of an object focused on the sensor by the first and third lens element groups.

17. The zoom lens system according to claim 9 wherein the third plurality of lens elements includes a positive lens element on the object side of the third lens element group, the positive lens element having aspherical surfaces and relatively strong optical power, and a negative lens element on the image side of the third lens element group, the negative lens element primarily correcting for aberrations and having aspherical surfaces and relatively weak optical power.

18. A digital still camera, comprising:

an outer housing;

a first positive lens element group mounted in a fixed location along an optical axis in front side of the housing;

a second negative lens element group mounted inside the housing and moveable along the optical axis behind the first lens element group;

a third positive lens element group mounted inside the housing and moveable along the optical axis behind the second lens element group;

an aperture stop mounted inside the housing between the second lens element group and the third lens element group, the aperture stop normally remaining stationary during a wide angle-to-normal portion of a zooming operation, and moveable along the optical axis with the third lens element group during a remainder portion of the zooming operation;

an electronic image sensor mounted inside the housing along the optical axis rearward of the third lens element group for receiving an image of an object on an active surface of the sensor and for generating electrical signals representative of the image;

drive means for moving the second and third lens element groups and the aperture stop back and forth along the optical axis; and a processing circuit connected to the electronic image sensor and the drive means for moving the second and third lens element groups and the aperture stop to perform a zoom operation.

19. A zoom lens system, comprising:

a first positive lens element group located at a first position along an optical axis, the first lens element group having a first plurality of lens elements each having only spherical surfaces;

a second negative lens element group moveable along the optical axis on an image side of the first lens element group, the second lens element group having a second plurality of lens elements including a negative lens element having at least one aspherical surface and a relatively weak optical power that primarily corrects for aberrations;

a third positive lens element group moveable along the optical axis on an image side of the second lens element group, the third lens element group providing a majority of the magnification change during a zooming operation and having a third plurality of lens elements including a pair of lens elements each having at least one aspherical surface; and an aperture stop positioned along the optical axis between the second lens element group and the third lens element group.

20. A zoom lens system, comprising:

a first positive lens element group located at a first position along an optical axis, the first lens element group having a first plurality of lens elements each having only spherical surfaces;

a second negative lens element group moveable along the optical axis on an image side of the first lens element group, the second lens element group having a second plurality of lens elements including a lens element having at least one aspherical surface;

a third positive lens element group moveable along the optical axis on an image side of the second lens element group, the third lens element group providing a majority of the magnification change during a zooming operation and having a third plurality of lens elements including a positive lens element on the object side of the third lens element group, the positive lens element having at least one aspherical surface and a relatively strong optical power, and a negative lens element on the image side of the third lens element group, the negative lens element primarily correcting for aberrations and having at least one aspherical surface and a relatively weak optical power; and an aperture stop positioned along the optical axis between the second lens element group and the third lens element group.

* * * * *